Figure 1:
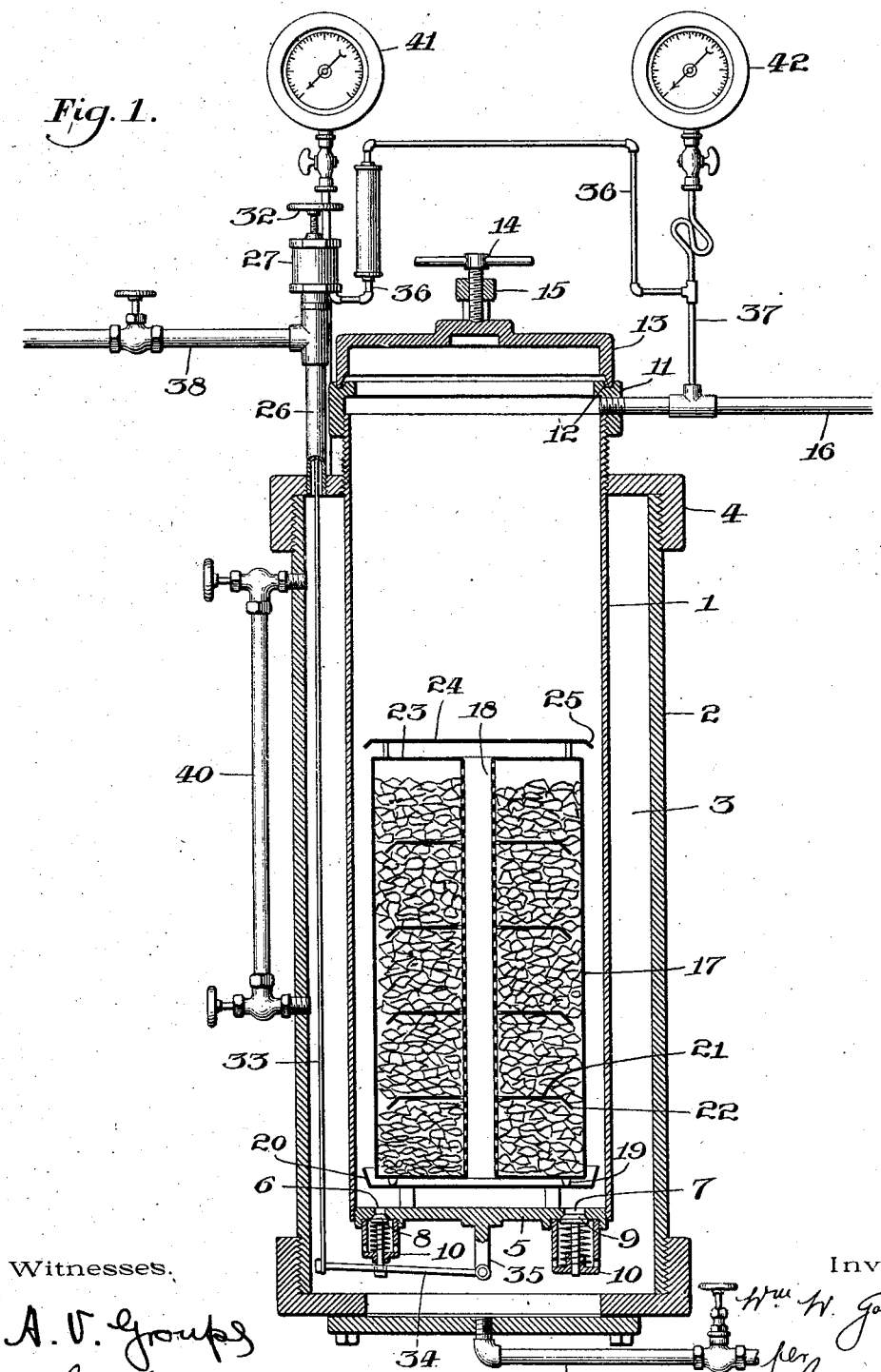

(No Model.) 2 Sheets—Sheet 2.
W. W. GOODWIN.
ACETYLENE GAS GENERATOR.
No. 604,879. Patented May 31, 1898.
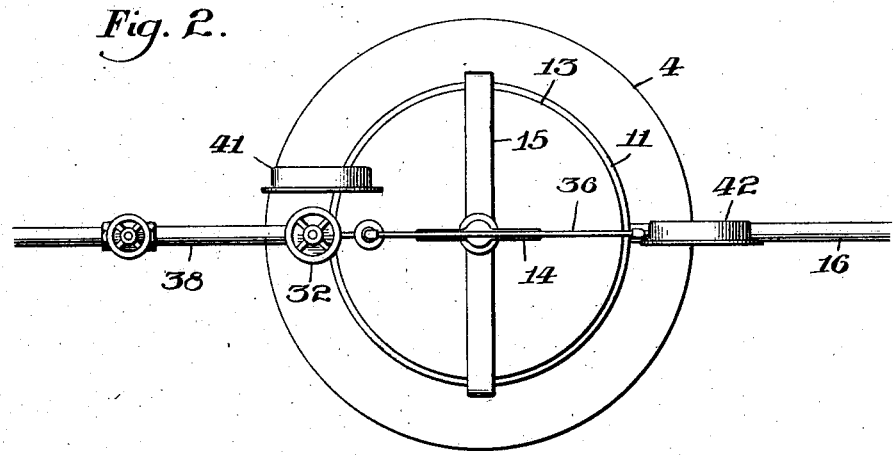
Fig. 2.
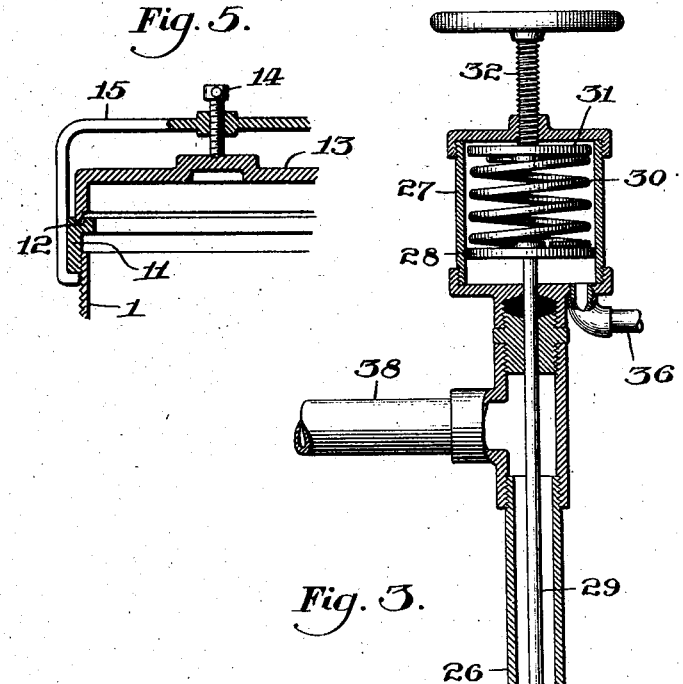
Fig. 5.
Fig. 3.
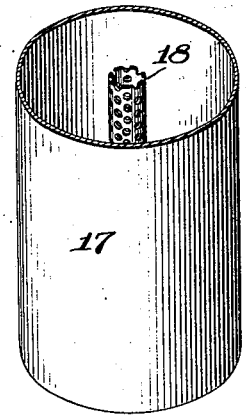
Fig. 4.
Witnesses.
A. V. Groupes
John F. Basford
Inventor.
Wm. W. Goodwin,
per John B. Nolan
Attorney.

UNITED STATES PATENT OFFICE.

WILLIAM W. GOODWIN, OF BORDENTOWN, NEW JERSEY.

ACETYLENE-GAS GENERATOR.

SPECIFICATION forming part of Letters Patent No. 604,879, dated May 31, 1898.

Application filed April 13, 1896. Serial No. 587,401. (No model.)

*To all whom it may concern:*

Be it known that I, WILLIAM W. GOODWIN, a citizen of the United States, residing at Bordentown, in the county of Burlington and State of New Jersey, have invented certain new and useful Improvements in Gas-Generating Apparatus, of which the following is a full, clear, and exact description, reference being had to the accompanying drawings, forming a part of this specification.

This invention relates to apparatus for generating and supplying illuminating-gas, having reference more especially to simple and efficient means for the safe and economic production of acetylene gas from the compounds of magnesium and calcium carbid.

In the present embodiment of my invention I employ a structure having therein two chambers—to wit, an annular water-containing chamber and a central gas-generating chamber—a carbid-supporting tank or holder of novel construction arranged within the latter chamber, a valved port affording communication between the two chambers, an automatic governor operatively connected with the valve in said port, and an exit or distributing pipe leading from the central chamber and having communication with the governor, whereby when the said port is opened the water will pass into the central chamber, enter the tank therein, and, coming into contact with the contained carbids, will effect the generation of gas, which gas will thereupon ascend in said latter chamber and pass therefrom through the outlet-pipe to the point of distribution or storage. Should the gas generated attain or exceed a certain pressure, the governor is actuated to effect the sealing of the valved port, whereupon the supply of water to the carbids is checked until the gas falls to the normal pressure, in which event the governor effects the opening of the valve to permit the entrance of the water to the carbids. Hence the operation of the apparatus is entirely automatic so long as the same is charged with water and carbids. The gas-generating chamber is also equipped with a safety-valve, which is automatically opened to allow the escape of the surplus water from said chamber in the event of an excessive pressure of gas therein, as will presently appear.

The invention also comprises various novel features of construction and organization of parts, which will be hereinafter particularly described and claimed.

In the drawings, Figure 1 is a vertical section of the apparatus. Fig. 2 is a plan thereof. Fig. 3 is a vertical section of the governor device, enlarged. Fig. 4 is a sectional perspective of the carbid-containing tank. Fig. 5 is a sectional detail of the upper end of the gas-generating cylinder with its cap or head and the clamping and retaining devices therefor.

The numerals 1 and 2 represent two cylinders of appropriate size for their intended purpose, the former being of less diameter than the latter and being arranged therein so as to form an annular space 3.

The outer cylinder is capped or headed at both ends, the inner cylinder being extended through and supported by the upper cap or head 4. Screwed or otherwise secured to the bottom of the inner cylinder is a head 5, in which are formed two ports 6 7, that afford internal communication between the two cylinders. Normally seated in these ports so as to close the same are valves 8 and 9, respectively, the stems and pressure-springs of which are supported in brackets 10, depending from the head. One, 6, of these ports constitutes an inlet whose valve is opened, as below described, to permit the passage of water from the outer to the inner cylinder in a manner to act upon carbids contained in the latter and effect the evolution of gases therefrom, as will presently appear. The valve in the other port, 7, acts as a safety-valve, which in the event of excessive pressure of the gas so evolved is forced outward to open the port and allow to escape the surplus water which has entered the inner cylinder. Surrounding the upper end of this cylinder is a flanged ring 11, in which is formed a groove 12, which affords a seat for the ground or faced edge of a cap or head 13, which groove may, if desired, be filled with lead or other suitable metal to insure a gas-tight joint. The cap is forced to its seat and retained in place by the action thereon of a screw 14, working in a cotter-bar 15, whose ends take under the ring 11. Extending through this ring into the interior of the cylinder 1 is an outlet-pipe 16, by way of which the gases generated in the cylinder escape to the point of consumption, distribution, or storage. Within this cylinder is supported a tank or vessel 17, in which the carbids are contained. In the present instance this tank is cylindrical in form and is equipped with a central foraminated pipe 18, extending from end to end thereof. This pipe opens through the bottom of the tank and is affixed thereto, such bottom being provided with studs or feet 19, that rest upon a dish-like platform 20, supported upon the lower head of the inner cylinder, as shown.

The tank is charged as follows: At the outset an appropriate layer of carbids, &c., is placed upon the bottom of the tank. A diaphragm 21 with downwardly-turned edges 22 is then placed upon the layer, such diaphragm being provided with a central orifice, through which the pipe extends. Another layer of carbids, &c., is placed upon the diaphragm, and so on the diaphragm and carbids are arranged in alternate succession, as may be desired. The top of the tank when charged may be closed by means of a suitable cover 23, similar in form to the bottom, in which case the top of the tube may be soldered or otherwise secured within the central orifice in the cover, the whole forming what may be termed a "cartridge." A diaphragm 24, preferably with downwardly-turned edges 25, is supported above the tank, such diaphragm being provided with suitable feet that rest upon the top of the latter.

The functions of the parts just described will presently appear.

Extending through the upper head of the outer cylinder 2 is a vertical pipe 26, which is surmounted by a governor-head. This head comprises a cylinder 27, carrying a piston 28, the rod 29 of which is fitted to an appropriate packing-box at the upper end of the pipe and depends in the latter. Resting upon the piston is a spiral spring 30, upon which is imposed a disk 31, against which bears a set-screw 32, fitted to the cap of the cylinder 27. The piston-rod is composed of two parts having a sliding or telescopic connection, the lower part being connected with the free end of a lever 34, that is fulcrumed to a lug or hanger 35 on the lower end of the gas-generating cylinder, which lever is connected with the stem of the inlet-valve 8 above described, to the end that if said lever be depressed the valve will be retracted from its seat to secure internal communication between the cylinders 1 and 2.

Opening into the bottom of the governor-cylinder is a pipe 36, which leads to a pipe 37, rising from the gas-outlet pipe 16, above referred to.

Connected with the pipe 26 is a supply-pipe 38, which leads from a tank, street-main, or other source of water-supply.

The cylinder 2 is provided at its lower end with a discharge-pipe 39, by means of which the water may be run off as desired. It is also provided with a water-line gage 40 and with a water-pressure gage 41.

The cylinder 1 is provided with a suitable gage 42, by means of which the pressure of gas within the generating-chamber may be readily determined.

Having thus described what I consider to be a simple and efficient construction of my apparatus, I shall now describe its operation, as follows: Assuming the tank to be supplied with carbids, &c., and disposed within the cylinder 1, as above explained, and the cap 13 to be clamped in place, the valve on the water-supply pipe 38 is opened and the cylinder 2 is thereby supplied with water. The set-screw 32 is then screwed down, so as to depress the spring and piston in the governor-head, thereby also depressing the lever 34, so as to retract the valve 8 and open the port 6, in consequence of which the water in cylinder 2 flows into the cylinder 3, thence upon the platform 20, and up through the central tube 18 in the tank. The water will thus be evenly distributed to the carbids, &c., contained in the first layer and effect the evolution of gas therefrom, which gas will then pass up around and between the loosely-fitted diaphragm and the inner wall of the tank and also through the central tube, thereupon coming in contact with the upper layers of carbids, &c., successively, by which more or less of the moisture will be absorbed. The function of the diaphragms is to prevent the too-rapid contact of the water with the superimposed layers of carbid, &c., the turned edges thereof also serving to separate and retain the moisture from the gas to a more or less degree. As the gas leaves the tank any moisture therein will come in contact with the exterior diaphragm 24, the turned edges of which will also assist in retaining moisture. The gas will then pass from the generating-chamber by way of the outlet-pipe 16 and be forced by the pressure within the generating-chamber to the source of distribution or storage. The gas will also pass by way of the pipes 37 36 to the lower portion of the cylinder 27 and against the piston therein; but as the normal pressure of the gas is not sufficient to compress the spring the position of the governor will be unaffected, and hence the valve 8 will remain open. Should, however, the gas within the cylinder reach an abnormal pressure, the piston will be raised against the action of the spring, thereby correspondingly raising the upper section of the piston-rod and relieving the pressure of the lower section upon the lever, in consequence of which the valve 8 resumes its seat and checks the ingress of the water to the generating-chamber. When, however, the gas falls to or below the normal pressure, the piston 28 resumes its previous position and thus effects the opening of the valve 8, which valve remains opened until the pressure in the generating-chamber becomes abnormal, as just stated. An equal pressure of gas is thus automatically attained. If upon the closing of the valve 8 under the circumstances stated the pressure of the gas generated should become excessive by reason of an accumulation thereof in the chamber through non-delivery at the point of distribution or storage or non-use at the burners, &c., the valve in port 7 will be forced open, thereby causing the surplus water in the generating-chamber to reënter the outer cylinder, which action will diminish or check the process of generation. This being accomplished, the valve 9 will resume its seat and the generating operation will be continued.

I claim as my invention—

1. In a gas apparatus, the combination of a generating-chamber in which the source of gas is contained, of a surrounding water-containing chamber or space with the lower portion of which the generating-chamber has communication, valve mechanism for controlling the communication between said chambers, and a gas-operated governor operatively connected with the valve mechanism, substantially as specified.

2. In a gas-generator, the combination of an outer water-chamber, a generating-chamber supported within the water-chamber and having a valved port at its lower end which opens into said water-chamber, a receptacle supported in said generating-chamber said receptacle having a central perforated tube therein and layers of carbid &c. surrounding said tube and partially separated from each other by diaphragms, and means for controlling automatically the valve of said port, substantially as specified.

3. In a gas-generator, the combination of a generating-chamber in which the source of gas is contained, a water-chamber having communication with the lower portion of said generating-chamber, and means for automatically controlling such communication, a return port or passage from the generating-chamber to the water-chamber, and an automatically-operating valve which controls the said port or passage, substantially as specified.

4. In a gas apparatus, the combination with a generating-chamber in which the source of gas is contained, a water-chamber having communication with the lower portion of the generating-chamber, valve mechanism controlling such communication, a gas-operated governor connected to the said valve mechanism, a return port or passage from the generating-chamber to the water-chamber, and safety-valve, controlling said return port or passage, substantially as specified.

5. In a gas apparatus, the combination of a generating-chamber in which the source of gas is contained, a water-containing chamber with the lower portion of which the generating-chamber has communication by a port in its bottom wall, a normally-closed valve for controlling the said port, a cylinder, a piston therein, a spring acting upon the piston, means to depress the spring and piston, connections between said piston and the valve, and a pipe leading from the generating-chamber to said cylinder and communicating with the same below its piston, substantially as specified.

6. In a gas apparatus, the combination of a generating-chamber, a vessel therein provided with a perforated pipe, detachable diaphragms for said vessel and of less diameter than the vessel, and means for supplying liquid to said pipe, substantially as described.

7. In a gas apparatus, the combination of a generating-chamber, a vessel therein to receive layers of carbids, &c., diaphragms of less diameter than the vessel and provided with drooping edges and adapted to separate such layers except at the outer marginal portions thereof, and means for supplying water to such vessel, substantially as described.

8. In a gas-generating apparatus, the combination of a generating-chamber, a water-chamber with the lower portion of which the generating-chamber communicates, means for automatically controlling such communication, a vessel in the generating-chamber adapted to receive layers of carbids &c. said vessel having a central perforated tube, diaphragms to separate such layers and a diaphragm supported above said vessel, substantially as specified.

9. In a gas-generating apparatus, the combination of an outer cylinder having a removable screw cap or head at each end, an inner cylinder extended through and supported in the upper cap or head of said outer cylinder, a valved port in the lower end of the inner cylinder, means for automatically actuating the valve of said port, and means for introducing water within the outer cylinder, substantially as described.

10. In a gas-generating apparatus, the combination of an outer cylinder capped or headed at both ends, an inner cylinder extended through and supported in the upper cap or head of said outer cylinder, a valved port in the lower end of the inner cylinder, a pipe rising from the outer cylinder, a governor-cylinder on said pipe, a piston therein, connections between the piston and the valve of said port, and a pipe leading from the inner cylinder to said governor-cylinder, substantially as described.

In testimony whereof I have hereunto affixed my signature in the presence of two subscribing witnesses.

WILLIAM W. GOODWIN.

Witnesses:
JOHN R. NOLAN,
JOHN F. BASFORD.